March 27, 1934. P. WILMART 1,952,958
STABILIZER FOR MOTOR VEHICLES
Filed March 18, 1931
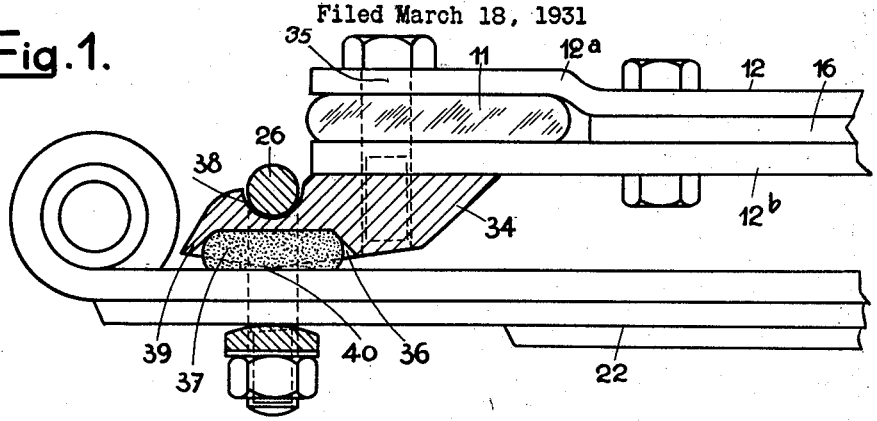
Fig.1.
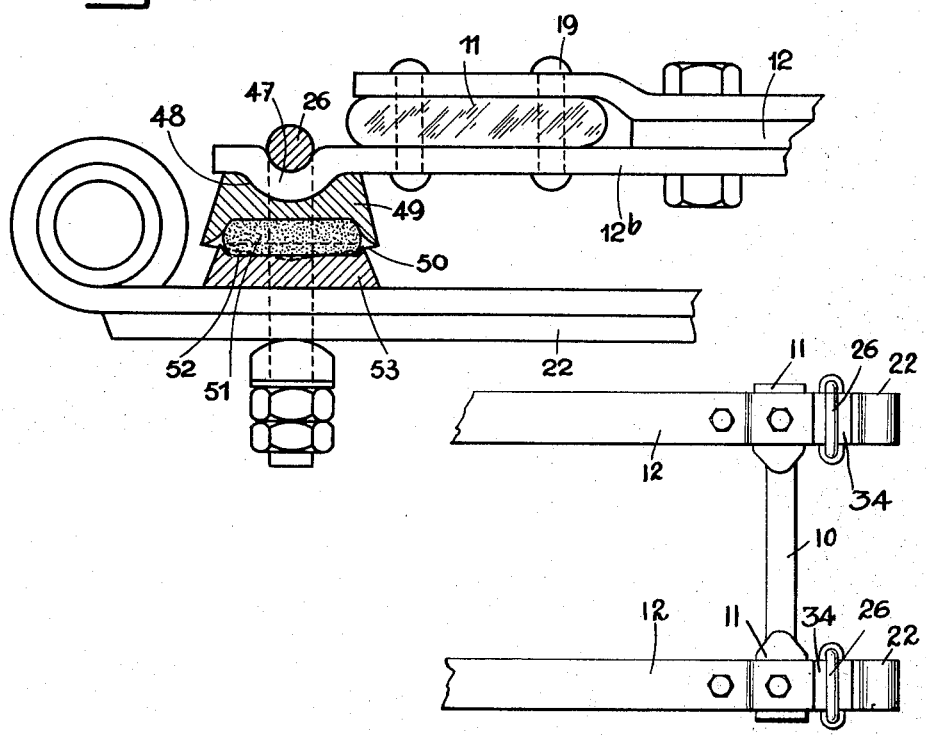
Fig.2.
Fig.3.
INVENTOR
PIERRE WILMART
BY Guthrie ATTY.

Patented Mar. 27, 1934

1,952,958

UNITED STATES PATENT OFFICE 1,952,958

STABILIZER FOR MOTOR VEHICLES

Pierre Wilmart, Brussels, Belgium

Application March 18, 1931, Serial No. 523,565
In Belgium March 20, 1930

8 Claims. (Cl. 267—11)

In my patent issued July 12, 1932, 1,866,958, a stabilizing device for motor vehicles, has been described and illustrated, said stabilizer consisting of a rigid, preferably tubular member arranged transversely of the chassis of the vehicle and provided near its ends with two parallel relatively elastic arms extending in the longitudinal direction of the chassis, the said transverse member working in torsion for transmitting to one of the arms, and in the same direction, the angular movements of the other arm.

According to one construction of the said device the transverse member provided with the two elastic arms, is mounted on the suspension springs near their ends in such a manner that it can oscillate, whilst the ends of the arms may be connected with play relatively to the said springs, close to the axle, or conversely.

The transverse member oscillating on the suspension springs has flattened ends held in contact with rounded-off interposed bearing surfaces for the purpose of enabling the oscillation to take place by swinging on the said supports, the said flattened ends of the transverse member engaging moreover with a loop or slot provided in each of the elastic longitudinal arms.

My present invention consists essentially in first providing an elastic connection between the longitudinal arms and the suspension springs, and in further providing an elastic coupling device which will enable one to build up the transverse member in two portions so as to impart to the latter a relative elasticity in the direction of the torsional strain where it is desirable to make the longitudinal arms more or less rigid.

Merely by way of example, the objects of my invention are hereinafter described with reference to the accompanying diagrammatical drawing, in which, Fig. 1 is a side elevation, partly in section, of the elastic connection provided between the longitudinal arms and the suspension springs.

Fig. 2 is a modification of the arrangement shown in Fig. 1.

Fig. 3 is a plan of the construction shown in Fig. 1.

According to the arrangement shown in Fig. 1, the end of the branch or blade 12b of each elastic arm 12 of the stabilizer rests upon a shoe 34 secured to the blade by a bolt 35.

The shoe 34 is provided with a cavity 36 adapted to receive a rubber block 37 forming an elastical support for the shoe 34 which in turn, is provided with a groove 38 for the clamping stirrups or yokes 26.

The rubber block being compressed by tightening the yoke, the longitudinal displacement of the arm 12 will result in simply distorting the rubber, and the cavity 36 is enlarged towards its lower end so as to allow for such distortion of the rubber block without the latter being displaced along the suspension spring 22.

To prevent a squashing of the rubber block by excessive tightening of the yokes 26, such as would prevent the rubber from being distorted when the stabilizer is displaced in longitudinal and angular directions, the lateral cheeks 39 of the cavity 36 may according to my invention, be formed so as to show a central rest 40 which will abut the main carrier of the suspension spring when the yokes are tightened without interfering with the angular movements of the shoe 34.

In the modification shown in Fig. 2 the deformable rubber block, instead of contacting directly with the suspension spring is held, by tightening of the clamping yokes in the respective cavities of a sole plate resting on the said spring and an interposed shoe supporting the corresponding end of each elastical arm.

As shown, the ends of the blades 12b of the longitudinal elastical arms 12, supporting and clamping the tubular transverse member 10—11, are provided with a depression or notch 47 adapted to receive the yoke 26.

This notch or depression is engaged in a corresponding groove 48 of a shoe 49 which is also provided with a cavity 50 adapted to receive a rubber block 51 inserted on the other hand in the cavity 52 of a sole plate 53 applied on the suspension spring 22.

The cavity 50 in the shoe 49, and if desired, the cavity 52 in the sole plate 53 are somewhat widened towards their edges so as to allow free distortion of the rubber when the arm 12 is displaced longitudinally, thus preventing frictional engagement between the sole plate 53 and the suspension spring.

It will be easily understood that any angular displacement of one of the arms 12, which may in this instance consist of rigid bars, will be resiliently transmitted to the other arm by means of the coupling described.

What I claim is:

1. A stabilizer for motor vehicles including longitudinal arms and means for resiliently connecting each of said arms to a suspension spring, said means including a shoe rigid with each arm and formed with a cavity in its under surface, a rubber block resting on the suspension spring and fitted within said cavity, means cooperating with the block and with the spring for securing the shoe to the spring, the walls of the cavity within the block being formed to directly engage with the suspension spring under the action of said securing means to avoid excessive distortion of the rubber block.

2. A stabilizer for motor vehicles of the type including a longitudinal arm to overlie the suspension spring, a shoe rigidly connected to the end of the arm, said shoe being formed in its under surface with a cavity overlying the spring, a rubber block bearing on the spring and seated in said cavity, a yoke securing the spring and shoe together, the ends of the cavity receiving the rubber block being enlarged longitudinally of the spring to permit distortion of the rubber block without displacement, certain walls of the cavity being formed to present a central rest to limit undue distortion of the rubber block under the action of the fastening means.

3. A stabilizer for motor vehicles of the type including longitudinal arms to overlie the suspension spring, means for securing the arms to the spring including a shoe underlying the end of the arm and formed in its under side with a cavity, a deformable rubber block seated in said cavity, and a sole plate bearing on the spring and underlying the rubber block, said sole plate being formed with a depression to receive the block, and means for securing the parts in applied position.

4. A stabilizer for motor vehicles of the type including longitudinal arms to overlie the suspension spring, means for securing the arms to the spring including a shoe underlying the end of the arm and formed in its under side with a cavity, a deformable rubber block seated in said cavity, a sole plate bearing on the spring and underlying the rubber block, said sole plate being formed with a depression to receive the block, and means for securing the parts in applied position, the end walls of the cavity in the shoe being spread to permit a more or less free distortion of the rubber block during the longitudinal displacement of the arm.

5. In a device for stabilizing the chassis of an automobile with reference to its axle, the combination of an axle, a transverse tubular oscillating shaft mounted on the suspension spring and having flattened end portions, two resilient arms extending from the axle and each formed of a flexible leaf spring secured at one of its ends to one of the flattened portions of said transverse shaft, a shoe fixed at each end of said arm, stirrups fixing said shoes to the suspension spring, and means to permit a resilient movement of said shoes upon the suspension spring.

6. In a device for stabilizing the chassis of an automobile with reference to its axle, the combination of an axle, a transverse tubular oscillating shaft mounted on the suspension spring and having flattened end portions, two resilient arms extending from the axle and each formed of a flexible leaf spring secured at one of its ends to one of the flattened portions of said transverse shaft, a shoe fixed at each end of said arm, stirrups fixing said shoes to the suspension spring, a cavity in the lower part of said shoe, a rubber block in this cavity and resting upon the suspension spring, and means to permit the angular displacement of this shoe and to avoid the squashing of the rubber block.

7. In a device for stabilizing the chassis of an automobile with reference to its axle, the combination of an axle, a transverse tubular oscillating shaft mounted on the suspension spring and having flattened end portions, two resilient arms extending from the axle and each formed of a flexible leaf spring secured at one of its ends to one of the flattened portions of said transverse shaft, a shoe fixed at each end of said arm, stirrups fixing said shoes to the suspension spring, a cavity in the lower part of said shoe, a rubber block in this cavity and resting upon the suspension spring, and lateral cheeks on said shoe and having a curved base resting on the suspension spring.

8. In a device for stabilizing the chassis of an automobile with reference to its axle, the combination of an axle, a transverse tubular oscillating shaft mounted on the suspension spring and having flattened end portions, two resilient arms extending from the axle and each formed of a flexible leaf spring secured at one of its ends to one of the flattened portions of said transverse shaft, an incurved portion at each end of the resilient arms for receiving a clamping yoke, a shoe having a first cavity in its upper part engaging said incurved portion, and a second cavity in its lower part, a rubber block in said second cavity, a sole plate resting upon the suspension spring and having a cavity in its upper part for receiving the under side of said rubber block.

PIERRE WILMART.